P. SUSOL.
ICE CUTTING MACHINE.
APPLICATION FILED APR. 6, 1909.

950,969.

Patented Mar. 1, 1910.
4 SHEETS—SHEET 1.

Fig. 1.

Witnesses
Hugh Holt
E. P. Bmayer

Inventor
Paul Susol
By Victor J. Evans
Attorney

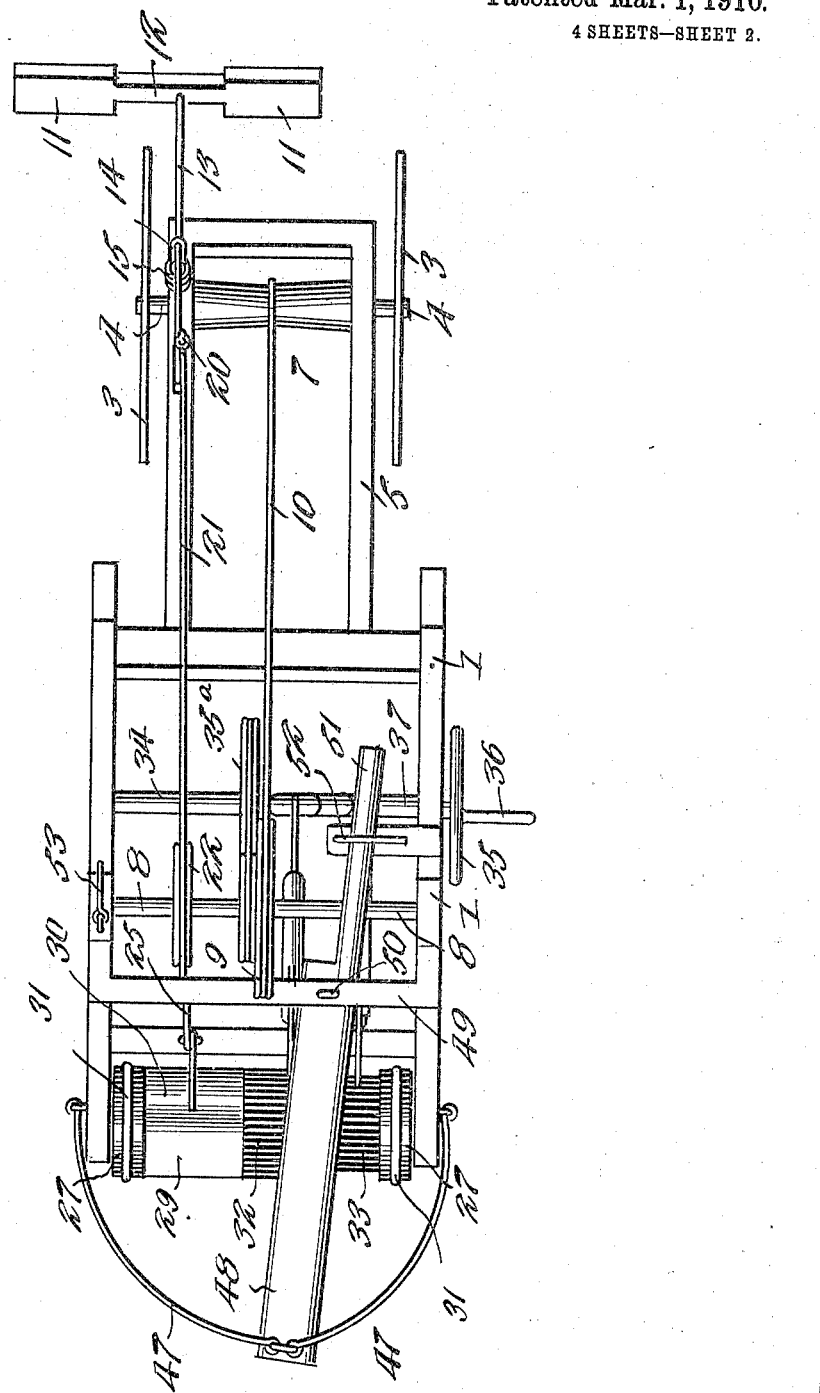

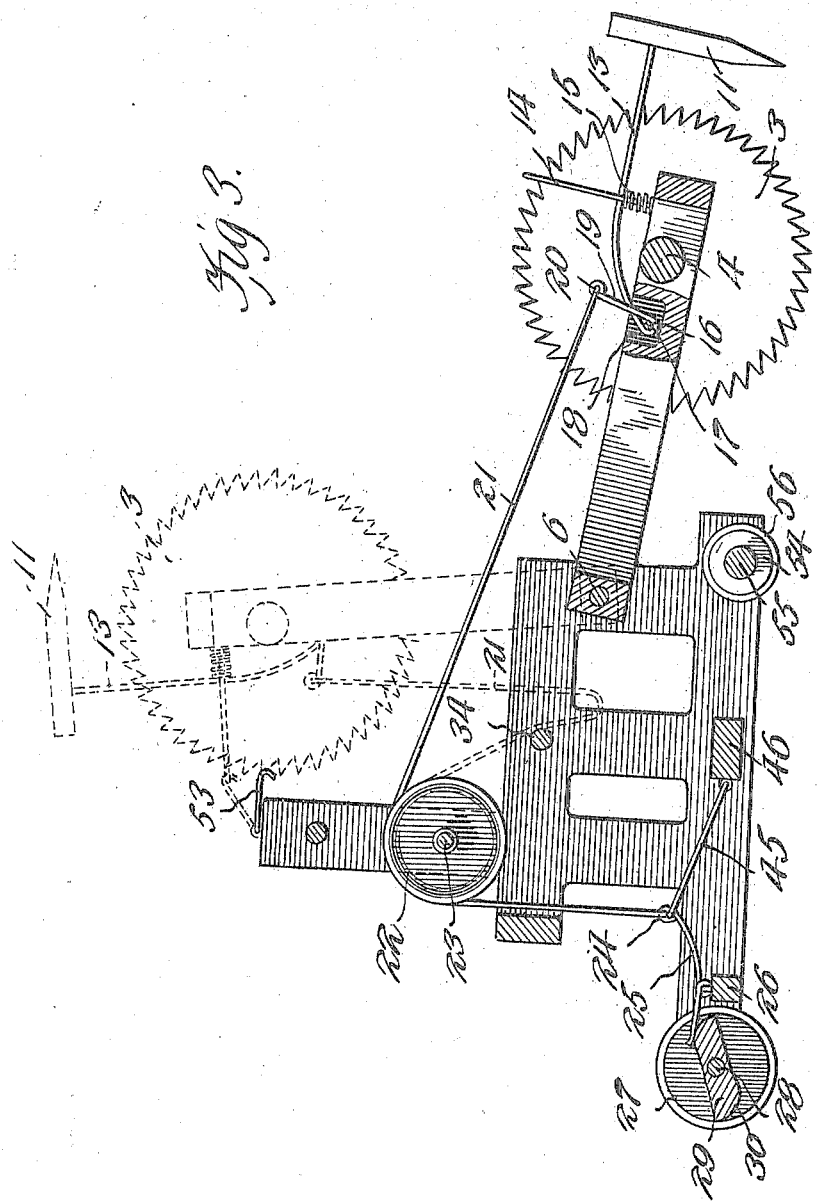

P. SUSOL.
ICE CUTTING MACHINE.
APPLICATION FILED APR. 6, 1909.

950,969.

Patented Mar. 1, 1910.
4 SHEETS—SHEET 4.

Witnesses
Hugh H. Ott

Inventor
Paul Susol
By Victor J. Evans
Attorney

UNITED STATES PATENT OFFICE.

PAUL SUSOL, OF ALLEGHENY, PENNSYLVANIA.

ICE-CUTTING MACHINE.

950,969.  Specification of Letters Patent.  Patented Mar. 1, 1910.

Application filed April 6, 1909. Serial No. 488,217.

*To all whom it may concern:*

Be it known that I, PAUL SUSOL, a citizen of the United States of America, residing at Allegheny city, in the county of Allegheny and State of Pennsylvania, have invented new and useful Improvements in Ice-Cutting Machines, of which the following is a specification.

This invention relates to ice cutting machines, and one of the principal objects of the same is to provide a machine which will cut ice into strips and sever the strips into blocks as the machine passes over the ice.

Another object of the invention is to provide a simple and efficient machine for cutting ice into blocks, the cutters being preferably operated by hand to cut the ice into blocks of regular sizes.

Still another object of the invention is to provide means whereby the saws and the block cutters may be raised out of operative position when it is desired to convey the machine from place to place.

Another object of the invention is to provide an ice cutting machine in which novel and efficient means are provided for steering the machine in a straight course and holding it to its work.

These and other objects may be attained by means of the construction illustrated in the accompanying drawings, in which,—

Figure 5:
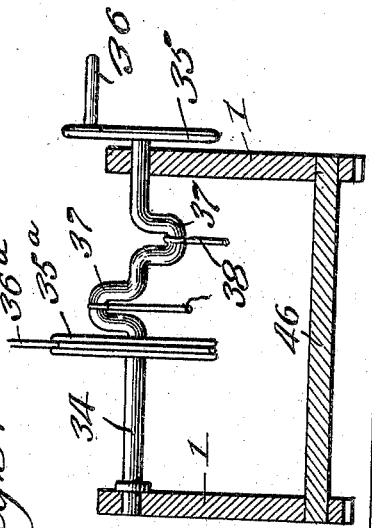
Figure 4:
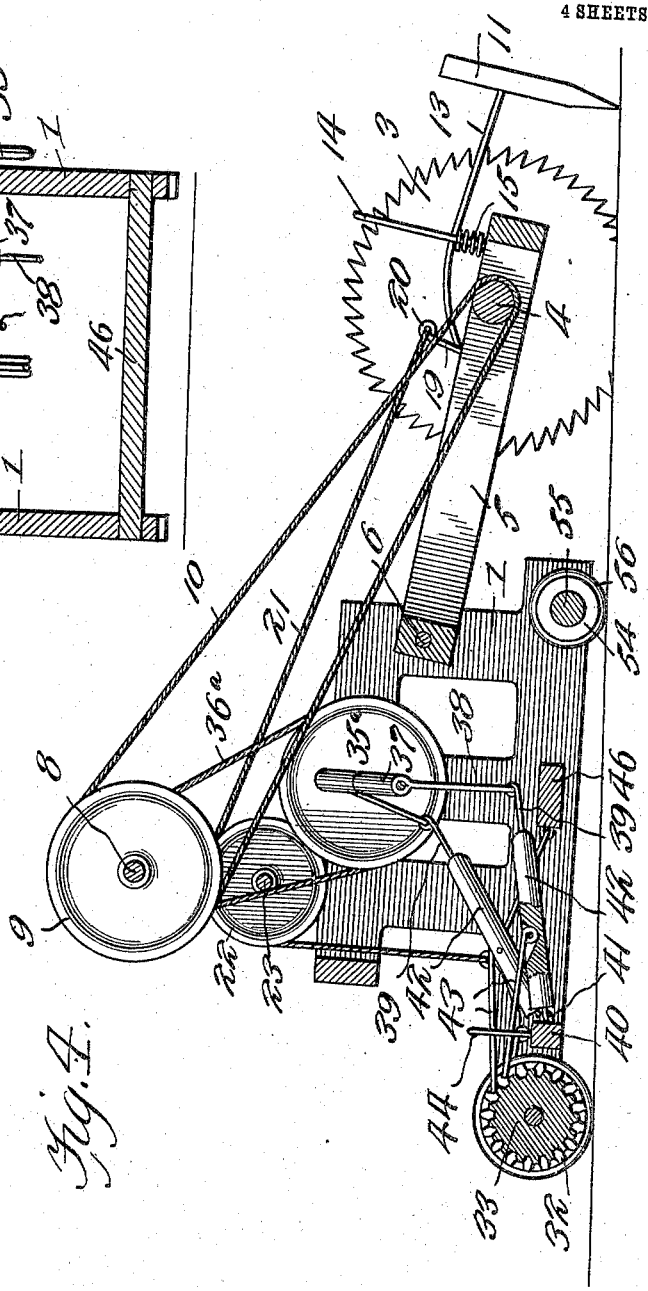

Figure 1 is a side elevation of an ice machine made in accordance with my invention. Fig. 2 is a plan view of the same. Fig. 3 is a central longitudinal section of the machine, the saws and block cutters being shown in dotted lines thrown into an inoperative position to permit the machine to be conveyed from place to place. Fig. 4 is a longitudinal sectional view of the machine shown in operative position. Fig. 5 is a transverse section taken at one side of the crank shaft.

Referring to the drawing, the numeral 1 designates the frame of the machine, and secured at one side of the frame is a platform 2 for the operator. Saws 3 are mounted on an axle 4 journaled in a frame 5, said frame being pivoted in the frame 1 upon trunnions 6. A bar 6ᵃ is connected at its lower end to the frame 5, and its upper end is provided with a stud 6ᵇ which is adapted to engage a perforation in the top of frame 1 to hold the saw frame in elevated position. On the axle 4 between the side bars of the frame 5 is a roller 7. Journaled in the frame 1 is a shaft 8, and mounted on said shaft is a grooved pulley 9. A belt or band 10 extends around the roller 7 and around the grooved pulley 9. The block cutter consists of the two beveled choppers 11 connected by a central shank 12. Secured to the shank 12 is a rod or bar 13 which extends through a keeper or staple 14 provided with a spring 15 upon which the shank 13 is supported when in its lowermost position. The shank 13 is provided with a loop 16 connected to a cross pin 17 seated in a recess 18 in one of the side bars of the frame 5, as shown more particularly in Fig. 2. Extending from the loop 16 is an upwardly projecting arm 19 having a loop 20 in its upper end. Connected to the loop 20 is a cable 21 extending over a grooved pulley 22 mounted on a shaft 23 journaled in the frame 1. The end of the cable 21 is connected, as at 24, to a tappet 25 hinged to a cross bar 26 on the frame 1. The rear bearing wheels 27 of the machine are mounted upon an axle 28. Secured to the axle 28 between the wheels 27 is a cam 29 having oppositely disposed rounded portions 30. The wheels 27 are provided with rubber tires 31. At one side of the cam 29 a ratchet roller 32 is disposed, and adjacent to the roller 32 is a similar ratchet roller 33 of somewhat reduced diameter.

Journaled in the frame 1 is a double crank shaft 34 on the outer end of which is a hand wheel 35 provided with a handle 36. On the crank shaft 34 is a grooved pulley 35ᵃ, and a driving band 36ᵃ extends around the pulley 35 and around the pulley 9 on the shaft 8. Connected to the oppositely disposed cranks 37 are links 38, said links being connected to rods 39, said rods being attached at their opposite ends to a cross bar 40 by means of hooks or loops 41. On the rods 39 are bars 42, and connected to each of said bars is a pawl 43, said pawls each extending through a keeper 44 on the cross bar 40. As the shaft 34 is rotated by the operator the pawls 43 are alternately actuated to push backward upon the ratchet rollers 32, 33 to hold the saws to the work. Connected to the tappet 25 is a rod 45 which extends to a cross bar 46 and is secured thereto.

To steer the machine and hold it in proper alinement, a pair of rods 47 are connected to the sides of the frame 1, and at their inner ends said rods support a steering bar 48 which bears at its lower end upon the ice to hold the machine in proper draft line. The upper end of the bar 48 is connected to a cross bar 49 by a pin 50, and the handle end 51 of the bar extends through a loop 52 supported upon the frame 1. When desired, the pin 50 may be removed and the steering bar 48 raised from off the ice. When the saws and the block choppers are raised out of operative position they may be held upward by means of a latch 53 to engage the keeper 14, as shown in dotted lines in Fig. 3. The front wheels 54 are mounted upon an axle 55 journaled in the frame 1, said wheels being provided with rubber tires 56.

The operation of my invention may be briefly described as follows: As the machine is moved over the ice and the crank shaft 34 is rotated by the operator, the saws are rotated by means of the belt 10 and the connections to the crank shaft 34. At each half revolution of the shaft 28, the cam 29 strikes the tappet 25 which pulls down upon the cable 21 and rises the block choppers 11. As the cam 29 passes the tappet 25, the choppers 11 drop by gravity and strike the ice, cutting it into blocks.

From the foregoing it will be obvious that the two saws 3 will saw one complete strip of ice at each operation and that the choppers 11 will chop the strip previously cut into blocks.

My ice machine is of simple construction, can be manufactured at low cost, is efficient in operation and will operate without excessive power being applied thereto.

I claim:—

In an ice cutting machine and in combination with a frame mounted on wheels, a saw frame pivoted to said frame, saws journaled in said saw frame, a chopper, a shank extending from said chopper and pivoted on the saw frame, a staple, a spring surrounding said staple, said shank extending through said staple, a cable connected to said shank, a pulley over which said cable extends, a tappet connected to said cable, and a cam for operating said tappet to raise the chopper and permit it to drop by gravity.

In testimony whereof I affix my signature in presence of two witnesses.

PAUL SUSOL.

Witnesses:
 EDWARD COSLETT,
 W. R. WILLIAMS.